(12) United States Patent
Preyer

(10) Patent No.: US 7,117,594 B2
(45) Date of Patent: Oct. 10, 2006

(54) OIL-SCRAPER PISTON RING AND A METHOD FOR PRODUCING AN OIL-SCRAPER PISTON RING

(75) Inventor: Karlfried Preyer, Wermelskirchen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 10/169,774

(22) PCT Filed: Dec. 19, 2000

(86) PCT No.: PCT/EP00/13398

§ 371 (c)(1),
(2), (4) Date: Jul. 9, 2002

(87) PCT Pub. No.: WO01/53727

PCT Pub. Date: Jul. 26, 2001

(65) Prior Publication Data

US 2002/0190476 A1    Dec. 19, 2002

(30) Foreign Application Priority Data

Jan. 20, 2000   (DE) .............................. 100 02 282

(51) Int. Cl.
*B21K 1/14* (2006.01)

(52) U.S. Cl. .................. 29/888.07; 277/442; 29/888.3

(58) Field of Classification Search ................ 277/434, 277/440, 442–444; 29/888.3, 888.075, 888.074, 29/527.6, 888.07; 427/367, 404, 331; 451/51, 451/59
See application file for complete search history.

(56) References Cited

U.S. PATENT DOCUMENTS

| | | | |
|---|---|---|---|
| 2,696,038 A * | 12/1954 | Hunt ..................... | 29/888.074 |
| 2,905,512 A * | 9/1959 | Anderson .................. | 277/442 |
| 3,281,156 A * | 10/1966 | Mayhew .................... | 277/463 |
| 3,370,858 A * | 2/1968 | Braendel ................... | 277/477 |
| 3,435,502 A * | 4/1969 | Thompson et al. .... | 29/888.074 |
| 3,947,046 A * | 3/1976 | Maruyama et al. ........ | 277/443 |
| 4,085,490 A * | 4/1978 | McCormick et al. ...... | 148/589 |
| 4,161,321 A * | 7/1979 | Hendrixon et al. ........ | 277/444 |
| 4,251,599 A * | 2/1981 | McCormick ............... | 428/682 |
| 4,497,497 A * | 2/1985 | Berti et al. ................. | 277/463 |
| 4,522,412 A * | 6/1985 | Kubo ......................... | 277/443 |
| 4,973,066 A * | 11/1990 | Duck et al. ................ | 277/466 |
| 5,295,696 A * | 3/1994 | Harayama et al. ......... | 277/443 |
| 5,605,741 A * | 2/1997 | Hite et al. .................. | 277/443 |
| 5,901,963 A | 5/1999 | Hite et al. | |
| 6,267,380 B1 * | 7/2001 | Feistel ........................ | 277/309 |

FOREIGN PATENT DOCUMENTS

| | | |
|---|---|---|
| DE | 42 36 641 A1 | 12/1993 |
| EP | 0 507 636 B1 | 9/1995 |
| EP | 0 924 319 A2 | 6/1999 |
| JP | 09196172 A * | 7/1997 |

* cited by examiner

*Primary Examiner*—Vishal Patel
(74) *Attorney, Agent, or Firm*—Venable LLP; Stuart I. Smith

(57) ABSTRACT

A piston oil control ring with at least one tapered running rail, provided with a wear-resistant coating, characterized in that a radial elevation with predetermined radial height and width, which is provided with the wear-resistant coating, is provided in the region of the tapered ring plane for the running rail.

6 Claims, 1 Drawing Sheet

OIL-SCRAPER PISTON RING AND A METHOD FOR PRODUCING AN OIL-SCRAPER PISTON RING

BACKGROUND OF THE INVENTION

The invention relates to a method for producing a piston oil control ring.

Producing non-coated piston oil control rings with tapered running rails is generally known. The problem until now was that coatings for these tapered running surfaces could not be provided with a uniform lapping along the complete ring circumference and on both running rails with the same radial dimensions or defined only in the upper region to ensure that a reduction in the oil consumption is a given during the running-in behavior.

Reference DE-A 42 36 641 discloses a piston oil control ring for internal combustion engines, which operates jointly with a coil wire spring that pushes its two running rails against the corresponding cylinder wall. The running rails in this case have a tapered design and are coated with a wear-resistant chrome layer. However, one disadvantage to be mentioned here is that when arranging two running rails and coating these with a wear-resistant coating, different running surfaces with respect to height and radial expansion are unavoidably formed in the region of the running rails during the subsequent lapping operation. As a result, the running behavior of the piston oil control ring will vary during the operating state. In addition to differences in the wear behavior of the two running rails or the associated running surfaces, this also results in a non-optimum oil consumption, particularly during the running-in behavior of the piston oil control ring.

SUMMARY OF THE INVENTION

It is the object of the invention to devise a method for producing a piston oil control ring, which ensures that the running rail or rails provided are such that both running rails have essentially the same running surface heights and radial extensions relative to the corresponding cylinder wall. In addition, the piston oil control ring provided should result in minimized oil consumption for the respective internal combustion engine, particularly in the running-in state, while simultaneously having a long service life.

This object is solved with a method for producing a piston oil control ring having at least one running rail coated with a wear-resistant coating in that a profile is created on the running rail side prior to depositing the wear-resistant coating, which profile is provided in the tapered region that forms the circumferential surface and simultaneously the running surface of the running rail with a radial elevation that projects radially outward, in that at least this profile is coated with the wear-resistant coating and a predetermined amount of material is removed, at least in the region of the elevation, to adjust a running-rail profile that is essentially uniform across the ring circumference.

Advantageous modifications of the subject matter of the invention are disclosed.

The object is furthermore solved with a piston oil control ring having at least one tapered running rail provided with a wear-resistant coating, wherein the region of the tapered ring plane for the running rail, which forms the outer circumferential surface and simultaneously also the running surface of the running rail, is provided with a radial elevation having a predetermined height that is coated with a wear-resistant coating.

Advantageous modifications of the piston oil control ring according to the invention likewise are disclosed.

Prior to depositing the wear-resistant layer, in particular the chrome layer, a profile of this type is thus formed in the region of the running surface, which consists of a circumferential, preferably cylindrical elevation with a predetermined height, which projects from the tapered plane. Following the depositing of the wear-resistant layer, particularly the chrome layer, a portion of this elevation is removed again, preferably through round lapping of the running rails, wherein this relates only to the wear-resistant layer. The completed ring has a defined cylindrical remaining surface with radial elevation, in particular following the finishing operation of profile grinding the running rail flanks.

The production method according to the invention results in a piston oil control ring design with a uniformly high running surface in the region of the running rail or running rails, as seen across the circumference, which running rails—when using piston oil control rings with two or more running rails—are designed with identical radial extension. Consequently, the running surfaces of all running rails are pressed with essentially the same force against the corresponding cylinder wall. This measure leads to a reduction in the oil consumption for the respective internal combustion engine, particularly during the running-in phase.

In contrast to the known prior art, an operable piston oil control ring is thus created, which has a long service life in addition to an optimized running-in behavior. The subject matter of the invention is shown with the aid of an exemplary embodiment and is described as follows.

DETAILED DESCRIPTION OF THE INVENTION

Figure 1:
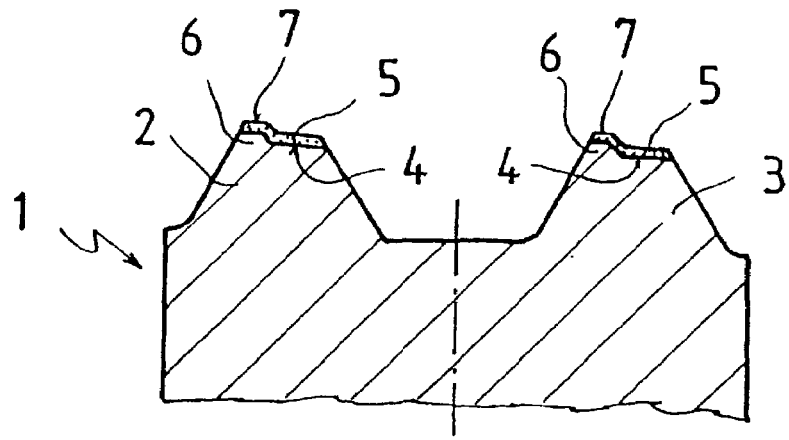
FIG. 1 is a schematic representation of the piston oil control ring according to the invention.

FIG. 1 shows a schematic representation of the piston oil control ring 1 according to the invention, which is provided with two running rails 2, 3. The outer circumferential surface 4 of the piston oil control ring 1 that is not provided with a wear-resistant layer has a tapered design. Before depositing the wear-resistant layer 5, which for this example is a chrome layer, the running rails 2, 3 of the piston oil control ring are provided with radially outward extending elevations 6 along the circumference (forming a step in each running rail), so that following the coating operation, the chrome layer 5 is also provided in this region 6. The elevations 6 for this example have a cylindrical design, which also applies to the wear-resistant layer 5 in this region. With a mechanical machining operation, uniformly high running surfaces 7 are formed in circumferential direction in the region of these radial elevations 6.

Figure 2:
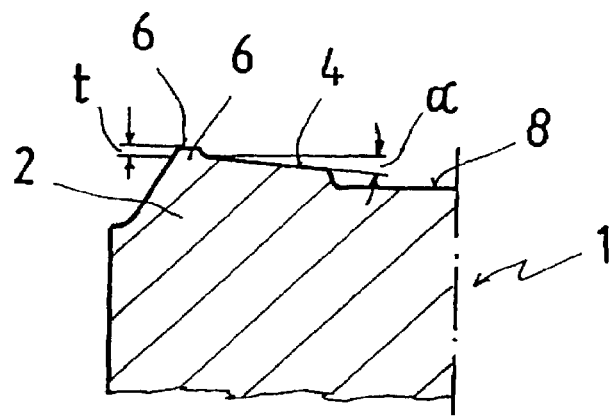
FIGS. 2 to 4 illustrate different steps in the production of the piston oil control ring according to the invention as shown in FIG. 1.
Figure 3:
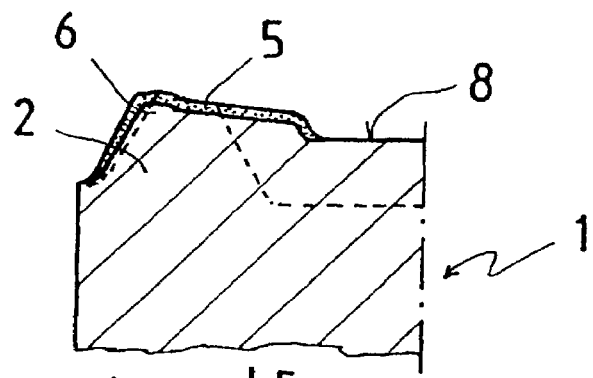
Figure 4:
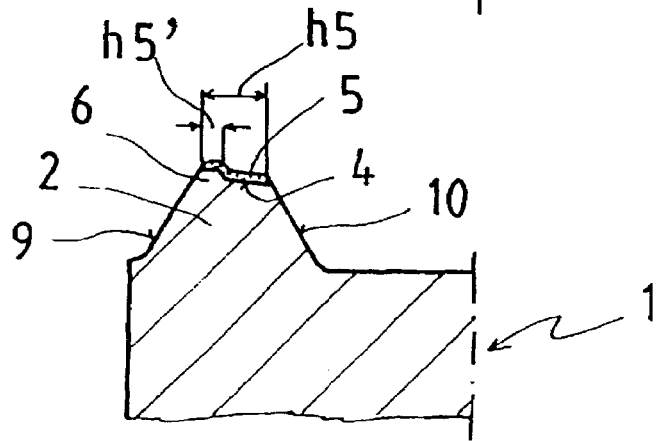

FIGS. 2 to 4 show different production stages for the piston oil control ring 1 according to the invention, shown in FIG. 1, wherein only the running rail 2 is shown. Initially, a tapered surface 4 with a predetermined gradient α is created in the region of the future running rail 2. An elevation 6 with predetermined radial height t and a cylindrical outer circumferential surface 6' extends radially outward from this tapered plane. The oil channels, which cannot be seen in further detail herein, are provided in the cylindrically extending region 8 of the piston oil control ring 1. The contour according to FIG. 2 is to be created mechanically for this exemplary embodiment.

FIG. 3 shows the condition following the deposit of the wear-resistant layer 5, which essentially covers the complete future running rail 2 as well as the elevation 6. The later contour of the running rail 2 as well as the cylindrical region 8 is shown with dashed line. Following the deposit of the wear-resistant layer 5, consisting of chrome for this example, a portion of the wear-resistant layer 5 is removed through round lapping of the running rail or the running rails.

FIG. 4 shows the contour of the finished piston oil control ring 1 with the profile of the running rail 2, the tapered region 4, as well as the radially outward pointing elevation 6 in connection with the wear-resistant layer 5. Following the profile grinding of the running rail flanks 9, 10, the completed piston oil control ring 1 has a defined cylindrical remaining surface h5' in the region of the radial elevation 6. The complete running rail height in this case is given the reference h5.

The invention claimed is:

1. A method for producing a piston oil control ring having at least two running rails coated with a wear-resistant coating, said method comprising:
    before the wear-resistant coating is deposited, forming in at least a part of an outer circumferential surface of a piston oil control ring, two running rail profiles, each provided with a tapered surface region which forms an outer circumferential surface of the running rail profile and simultaneously a running surface of the running rail profile, the running surface having an elevation that projects in a radial direction from a plane of the tapered surface region such that a step is formed between the running surface and the tapered surface region;
    providing at least each of the running rail profiles with the wear-resistant coating;
    removing a predetermined amount of the coating in at least the region of the elevations by round lapping to create essentially uniform running surface profiles across the circumference of the ring; and
    profile grinding the coated running rail profiles to form running rail flanks of the running rails;
    wherein the running rail flanks are substantially free of the wear-resistant coating.

2. A method according to claim 1, wherein the profiles are generated to form each of the radial elevations with a cylindrical outer circumference.

3. A method according to claim 1, wherein at least the regions of the running rails are chrome plated.

4. A method according to claim 1, wherein, along an axial direction of the piston oil control ring, the running surfaces of at least two of the running rails are formed on the same relative side of their respective steps.

5. A method according to claim 4, wherein, along an axial direction of the piston oil control ring, the running surfaces of all of the running rails are formed on the same relative side of their respective steps.

6. A method for producing a piston oil control ring having at least two running rails coated with a wear-resistant coating, said method comprising:
    forming at least two running rail profiles in at least a portion of an outer circumferential surface of the piston oil control ring, each running rail profile including:
    a tapered surface region forming an outer circumferential surface of each running rail profile; and
    a radial elevation that projects in a radial direction from a plane of the tapered surface region, wherein a step is formed between a cylindrical outer circumferential running surface of the radial elevation and the tapered surface region;
    after forming the at least two running rail profiles, applying the wear-resistant coating to at least the tapered surface region and the cylindrical outer circumferential running surface of the radial elevation of each of the running rail profiles;
    after applying the wear-resistant coating, removing a predetermined amount of the wear-resistant coating in at least the region of each radial elevation such that the coated cylindrical outer circumferential running surface of each radial elevation has a substantially uniform radial extension; and
    profile grinding each coated running rail profile to form running rail flanks of the running rails;
    wherein the running rail flanks are substantially free of the wear-resistant coating.

* * * * *